Jan. 4, 1966  J. F. CONIKER  3,227,471
THREE-SECTION FOLDER
Filed June 25, 1963  2 Sheets-Sheet 1
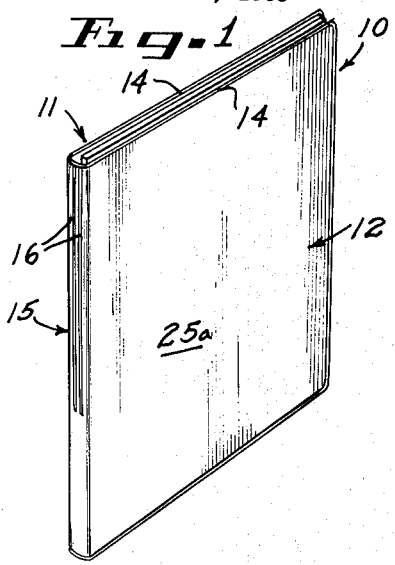
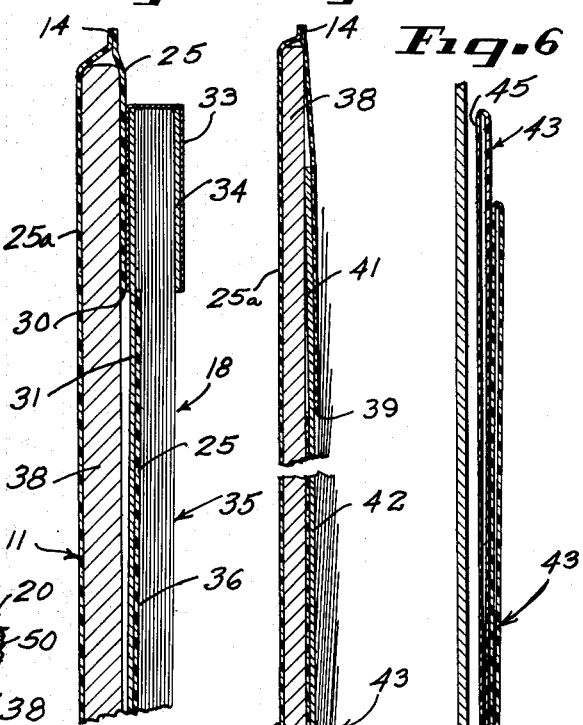
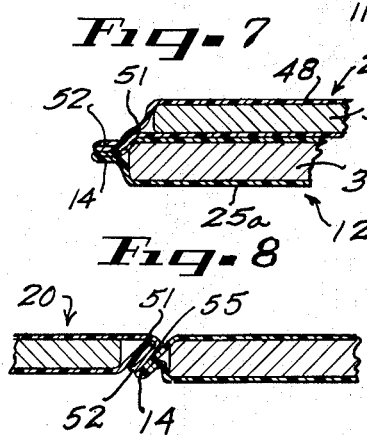
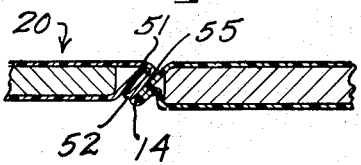
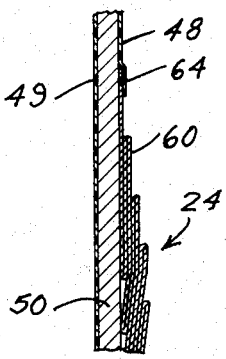
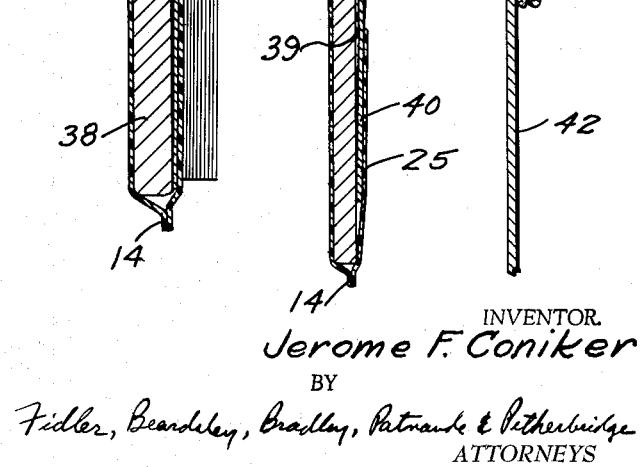
INVENTOR.
Jerome F. Coniker
BY
Fidler, Beardsley, Bradley, Patmank & Pitherbridge
ATTORNEYS

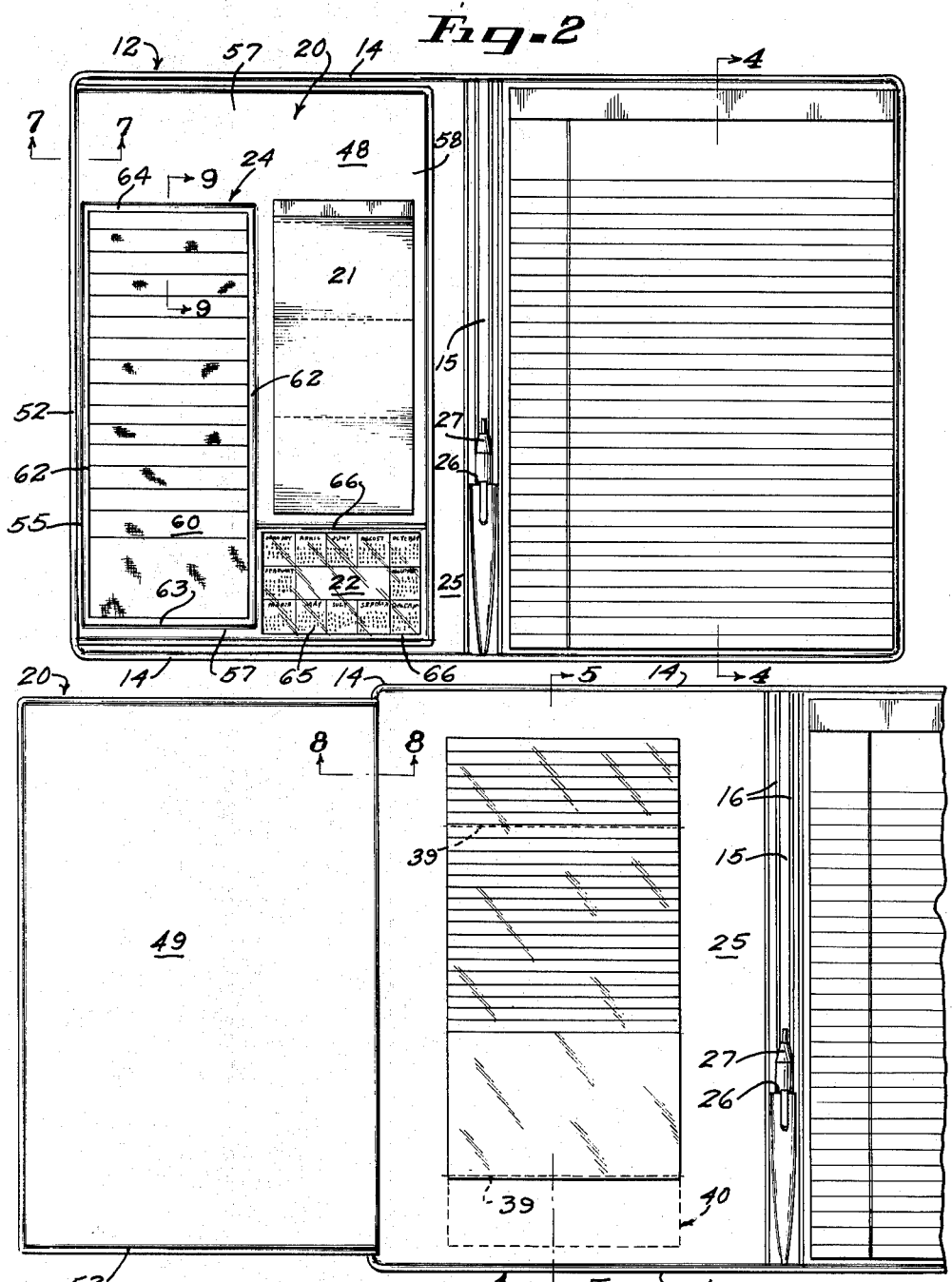

United States Patent Office 3,227,471
Patented Jan. 4, 1966

---

3,227,471
THREE-SECTION FOLDER
Jerome F. Coniker, Niles, Ill., assignor to Coniker Enterprises, Inc., Chicago, Ill., a corporation of Delaware
Filed June 25, 1963, Ser. No. 290,356
4 Claims. (Cl. 281—31)

The present invention relates broadly to a three-section folder and a method of making same; and more particularly to a prospectus portfolio article used by sales personnel for sales purposes and technical personnel as well as others for presentation of ideas, and utilizes printed materials, including visual cards containing intelligence placed for presentation in a predetermined manner to be described more in detail hereinbelow.

The folder hereof is particularly adapted for facilitating the transfer of goods and the performance and utilization of services in the channels of commerce. The device is also useful as an educational aid, particularly as used in personal tutoring; and by instructors, clergymen, and speakers. The device is arranged to present printed material which will aid ascertainment or defining of problems or questions; and is adapted for use in consideration of tenuous concepts, or deal with complex presentations involving several concepts. The device further provides facile means for sequentially exposing, with visual aids, suggestions for solutions of the questions or problems considered.

The new article is fabricated in a manner to present a slim and reserved motif in its external appearance. When folded, or in the closed position, the article presents the appearance of a two-section folder. This is particularly advantageous for sales personnel inasmuch as many prospects tend to be reluctant to begin an interview when the appearance of a briefcase or the like indicates bulk sometimes mentally associated with long and involved presentations.

The present folder is adapted to present for display many different aspects of given subject matter, or of a given line of articles or uses of merchandise, or a given presentation concerning the utilization of services, and contains same in an unusually compact article of manufacture.

The portfolio normally contains a large tablet of normal thickness and smaller note pads on two of the sections of a three section-fold. The material to be presented for initial consideration is confined in compact pockets in individual pamphlets therein contained. The appearance of a blank tablet is conducive to lessening of initial tension resulting in discussion regarding the requirements, or problems, of the prospect; and permits the salesman or executive or tutor to outline in simple form upon the tablet whatever conditions or questions may be pertinent.

In the course of the discussion notes can be made on the tablet in the view of prospect; and different of the literature to be presented may be withdrawn from suitable pockets and discussed. In the course of a normal sales presentation, it is usually found that a prospect has several questions that require answers in order to complete a sale. By the time that the notes have been made upon the tablet, and suitable folders displayed from an appropriate pocket from the two sections of the folder as displayed, the key problems in the prospect's mind will usually appear and be noted upon the tablet in view of both the prospect and the salesman.

When this point has been attained in a presentation by the sales person to the prospect, the third section of the folder can be rotated to its open position. With the folder thus opened, only the notes concerning the prospect's problem that appear upon the tablet are in view from the prior portion of the interview and, accordingly, attention becomes focused on points and problems and conditions raised during the preliminary sales discussion. At this time, the previously covered center portion of the prospectus is displayed or exposed and it is adapted to present visual aids containing suggestions, or equipment, etc., providing solutions of the problem.

In the specific embodiment of the present invention to be described below, there are provided 25 individual folders made of transparent material which may receive colored cards, or cards bearing equations or the like, or cards bearing prices and discounts and the like, whereby to present in visual form the answers to the problems arising during the sales presentation. By using this folder, the salesman attains the favorable aspect of being aided by visual answers to noted problems, which answers appear upon the cards as well as appropriate conjunctive remarks that can be uttered concerning the printed information upon the cards thus displayed as the prospect views same. The cards are in transparent leaved envelopes and are observable one at a time by overlapping a number of same. Accordingly, this portion of the interview can become very specific and directed to the primary problems or conditions presented in the discussion of which notes on the tablet remain in full view of both the salesman and the prospect.

Accordingly, it is a broad object of the present invention to provide a three-section folder that may be used as a prospectus portfolio.

A second object, in keeping with the preceding object, is to provide a three-section folder having the reserved slim appearance of a two-fold folder.

A further object in keeping with each of the above objects is to provide means connectable with surfaces of the folder for aiding in discussion and presentation, or the like in sequential steps.

A further object is to provide a heat sealed series of pleated integral pockets for receiving folders, cards, or the like.

A further object of the invention is to provide an improved line-hinge-edge for a third section of a folder whereby to present the appearance of a two-section folder.

A further object in keeping with the preceding object is to provide an improved method of manufacture of a three-section folder to render same the appearance of a two-section folder.

The foregoing and other objects and advantages reside in details of construction and the arrangement of components of the folder, and will be either obvious or pointed out in the following specification and claims, with reference being had to the accompanying drawings forming a part hereof, and in which:

FIG. 1 is a perspective view of the folder in its folded position;

FIG. 2 is a view of the folder with the inward sides of two sections exposed;

FIG. 3 is a view similar to FIG. 2 showing the third inward side;

FIG. 4 is a sectional view taken substantially on line 4—4 of FIG. 2;

FIG. 5 is a sectional view taken substantially on line 5—5 of FIG. 3;

FIG. 6 is an enlarged partial view of a part of FIG. 5;

FIG. 7 is a sectional view taken substantially on line 7—7 of FIG. 2;

FIG. 8 is a sectional view taken substantially on line 8—8 of FIG. 3, and

FIG. 9 is a sectional view taken substantially on line 9—9 of FIG. 2.

The folder to be described below can serve in several ways in the channels of commerce, but is particularly useful for the sale of items including services that are intangible in nature, or involve many items for consideration. For instance, a consulting engineer in the field of heating, ventilating and air conditioning might favorably use the present folder to present to a client a proposal for air conditioning.

As is well known, the problems of air conditioning involve many factors such as the rate of heat transferred through materials of several sorts, such as glass, masonry, roofs, floors and other structure of different materials. In addition, in different areas of the country, there are different requirements for the maintenance of temperature difference with respect to the inside and outside of a building, the occupancy or processes carried on therein, the relative humidity of the air to be maintained within the building, etc. Further, there are questions as to the availability of cooling water for the condensers, or the use of cooling towers to economize on use of water, etc. In addition to the above considerations, there are the further problems of utilization of individual space conditioners for several zones or the like within a building, utilizing a central conditioner, including ducts, defusers and the like to different zones. The question of automatic control in combination with the existing heating and ventilating equipment will require decision. In addition, the client is usually favorably impressed if, as a result of the preliminary discussion, a rough estimate can be given regarding time of installation and cost thereof.

As presently practiced in this field of engineering, even a preliminary investigation of several of the aspects regarding an installation of only nominal size involves the consideration of information normally maintained in several more or less bulky catalogues, manuals and folders. Because of this, it is customary for clients to be interviewed in the engineer's office where such items are at hand, rather than on the client's premises where the installation is to be made.

Accordingly, a further feature and advantage of the present invention is that data and literature concerning several items for consideration can be incorporated into a compact folder; and the same is readily portable so that the engineer and client can move about in the building to discuss different considerations in connection with such air conditioning installation, used here by way of example only.

Referring now in detail to the drawings and first to FIG. 1, a folder 10 has a first section 11 and a second section 12 formed of two rectangular sheets of suitable thermally sealable plastic. The plastic is preferably of commercially good quality and may present a leather-like appearance, at least on the exterior exposed surface thereof. The separate sheets of material are sealed peripherally around their edges 14 and at a common hinge portion 15 which has reinforcing and sealing ribs 16 securing the sheets of material together. As best shown in FIGS. 4 and 5, the seam 14 is preferably near the inside surfaces to lend a slim appearance to the folder 10. As viewed in FIG. 1, substantially only an edge of a tablet 18 is visible to a client with the folder 10 in the folded position shown. While this is of relatively lesser significance in regard to engineering clients, it is of particular advantage to a salesman because the appearance of slimness of the folder diminishes the reluctance of a prospect to be interviewed concerning sales material usually contained inside of the folder.

Referring now to FIG. 2, the first and second sections 11 and 12 are shown in open position as they would appear if laid upon the top of a desk. The third section 20 is shown in its folded position in which same exposes a note pad 21, a calendar 22, and folded pockets 24 heat sealed to the second section 12, and to be described more in detail below. It is seen that the seam 14 is continued entirely around the rectangular inner and outer sheets, only the inner sheet 25 common to the two sections 11 and 12 being shown. The outer sheet 25a is shown in FIGS. 1, 4 and 5, and is substantially identical in size to the inner sheet 25 and common to the sections 11 and 12. The sealing ribs 16 in the center portion 15 extend down to a cross-slit 26 in the inner sheet 25 of the cover material to provide a pouch intermediate the inner sheet 25 and the outer sheet 25a for receiving a pen 27, or the like. The shape of the pen 27 in the position shown causes the external sheet to assume an externally extended arc substantially as shown at the lower left-hand corner of FIG. 1 which permits a degree of transverse extension of the center part 15 to accommodate articles of different thickness within the folder while maintaining the sections 11 and 12 substantially flat and parallel in the folded position shown, FIG. 1.

The inner cover 25 of the folder section 11 is provided with a slit 30, FIG. 4, through which a cardboard back 31 of the conventional tablet 18 can be inserted until the tablet attains substantially the position shown in FIGS. 2 and 4. The tablet 18 has a conventional binder strip 33, a front cardboard strip 34 secured thereto and several sheets of paper 35. It is to be noted that the last or bottom sheets 36 of the tablet 32 rests adjacent the surface of inner plastic cover 25 and not upon the cardboard 31. It has been found that the writing characteristics are improved when the inner plastic is smooth, that is the writing is not caused to be erratic such as occurs when backed by the normally provided relatively rough surfaced cardboard back 31 of a conventional tablet. This is a further advantage of the invention and lends an aspect of quality thereto.

The inner sheet of material 25 and the outer sheet 25a are reinforced with cardboards 38, FIGS. 4 and 5. FIGS. 4 and 5 are herein shown in different scales; and it is preferred for most economical manufacture that these cardboards 38 be substantially the same size and thickness. However, for more sophisticated articles, the reinforcements 38 may be relatively thin and comprise more rigid fibre than ordinary cardboard. Other suitable material such as stiff flat plastic, or metal, or the like can also be used. As pointed out above, it is preferred that slimness of the folder be maintained for reasons presented hereinabove.

Referring now to FIG. 3, the third section 20 is shown in its open position which exposes the inner surface 25 of the second section 12. The inner surface 25 has upper and lower slits 39 into which ends 40 and 41 of a flexible card 42 supporting transparent envelopes 43 may be inserted and supported. Envelopes 43, of which there are 25 illustrated in FIG. 3, are adapted to receive for display suitably sized cards with information printed thereon.

FIG. 6 is an enlarged view of the upper end 41 of the flexible card 42 and showing two transparent envelopes 43 thereon. Each of the envelopes 43 are made of heat formable plastic and are formed with an inner leg 45, a leg 46 and an upturned latching edge 47. The edge 47 is cemented to a strip 48 in turn cemented to the card 42. This cement can be heat settable, if desired, to speed production. If desired, users of the folder may be supplied with several cards 42 whereby several sets of different intelligence can be displayed. The card 42 is readily removable from the slits 39 by pulling the center portions of the cards 43 to cause the strip 42 to flex and the ends 40 and 41 to slip out of the slits 39. To insert same, the card 42 is arched and the upper end 41 slipped into the upper slit 39 and moved upwardly therein as permitted by the length of the inner legs 45 of the transparent envelopes 43. The lower end 40 can then be inserted into the lower slit 39 and the entire card 42 slipped down to the position shown in FIG. 2.

In order to render the folder the appearance of a two-section folder, a line-hinge-edge is provided for securing the second and third sections 12 and 20 together at a distal edge of the second section 12. Referring now to FIG. 7, the third section 20 has an outer surface 48 and an inner surface 49 spaced by an internally sealed reinforcement sheet 50 that may be of hard cardboard, or other suitable material, and is preferably thinner than either of the reinforcement boards 38 forming the interior of the first and second folds 11 and 12 in order to maintain slimness in the finished folder 10. The surface materials 48 and 49 may be substantially identical in size and of the same thermal sealable material and are secured together by a heat sealed edge 52. It is to be noted that the edge 52, FIG. 7, is heat sealed inwardly in an area 51 adjacent the edge of the board 50. The extreme edge 52 thus extends downwardly whereby the third section 20 of the folder 10 will lie, when folded, substantially inwardly of the edge 52 and be concealed, or relatively unnoticeable As shown in FIG. 7 the heat sealed edge 52 (for purposes of clarity only) comprises four layers of material. However, in fabricating the finished product pressure and heat is supplied for finally sealing the sections 12 and 52 together to render the finished seam substantially similar to seam 14 and a continuation thereof as same embraces the other three sides of sections 11 and 12, described above. This construction provides a line-hinge 55 about which the third section 20 rotates with respect to the second section 12.

In FIG. 8, the third section 20 is shown in its open position. It is to be noted that the line-hinge 55 and the adjacent edge portion 51 will lie above the heat seal seam formed by the edges 52 and 14 of the folder sections 20 and 12 respectively. Again in this view, the folds have been shown as comprising four layers, although they are compressed in the actual product to appear like the seam 14.

As viewed in FIG. 2, the upper and lower border portions 57 and the inner border portion 58 of the third section 20 lie when folded within the overall dimensions of the second section 12. The third section 20 is also smaller than the first section 11, which (as shown) is the same size as the second section 12 further to facilitate concealment of the third section 20 to provide the appearance in folded position of a two-section folder substantially as illustrated in FIG. 1. The border portion 58 is sufficiently spaced from the hinge portion 15 to provide clearance for the pen 27 when the sections 11 and 12 are closed.

Referring now to FIG. 9, the pockets 24 are formed of a series of pleats 60; there being fifteen such pockets 24 formed in the embodiment illustrated. The pockets 24 are sealed to the surface 48 at their sides by heat seals 62, the bottom edge of the pleated strip is sealed at 63 and the top edge sealed at 64 to complete the pockets. These pleat-formed pockets 60 comprise a feature of this invention, and are adapted to receive printed data folders regarding manufacturer's products, or other data, in the example used herein. In connection with an air conditioning interview, such folders might be folded half size sheets, inserted at their edges into the pockets; and fifteen classifications of such folders can be accommodated. Obviously, these pockets can be much wider than shown in the drawing to accommodate wider materials up to substantially 8½ x 11 inches maximum to correspond in size to the size of the conventional tablet 32 shown in FIG. 2. In such instance, the calendar 22 and the note pad 21 could not be accommodated on the exterior surface 48 of the third folder 20. However, same could conveniently be accommodated, if desired on the inner surface thereof. It is further contemplated that the heat seal formed pocket 24 may conveniently be on the outer surface of the third fold 20, if desired, within the keeping of teachings of the invention, and for desired purposes of users thereof.

In the method of manufacturing the present folder, suitable reinforcing blanks are fabricated in known manner, and suitable heat sealable blanks for forming the surfaces of the sections 11, 12 and 20 are made. The blanks 25 and 25a are sealed at their edges 14 and at the common hinge area 15 over the reinforcing sheets 38 to form a two-section folder. Within the teachings of the invention, these surfaces could mount the pleated pockets 24 in place of the transparent envelopes 43, if desired; inasmuch as the purpose of both the pockets 24 and the envelopes 23 are primarily to provide for display or presentation of different aspects of related data at different times in a discussion or interview.

After the third section 20 is fabricated (as a separate unit from the sections 11 and 12) the appropriate edge thereof is heat sealed to the edge of section 12 to form the line-hinge 55 substantially as explained above in connection with the article. Several component portions may be fabricated and applied separately to the different surfaces forming parts of the sections, including slitting operations to provide the slits mentioned above, as well as other operations such as providing to reecive cards and tablets, a heat sealable window 65 sealed on at least two edges 66 to the inner surface 25 of the second section 12, for example, to receive a card, such as the calendar 22.

While the above disclosure explains a preferred embodiment of the invention, and an example of use of same, and a method of making same, obviously, other uses, methods and modifications of the article will occur to those skilled in the art. Accordingly, it is preferred that the invention not be limited to the specific disclosure above but by the scope of the annexed claims.

What is claimed is:

1. A three-cover folder adapted to appear as a two-cover folder when said covers are in closed position with a first cover overlying a second cover and having heat sealable surfaces, said folder comprising a first cover and a second cover having a first flexible hinge joining the inner edges of said covers for spacing said first and second covers and for affording relative movement of said first and second covers towards each other to a closed position with the outer edges of said covers adjacent each other and away from each other to an open position with the outer edges of said covers remote from each other, and a third cover of lesser width than said second cover joined to said second cover by a flexible, line-hinge edge located adjacent said outer edge of said second cover, said third cover being movable about said flexible, line-edge hinge from a first open open position with said line-edge hinge being located between the outer edge of said third cover and the inner edge of said second cover to a second closed position with the outer edge of said third cover being located adjacent said first hinge with the third cover lying flat against the second cover whereby, upon movement of said second cover with the third cover in said closed position above said first hinge to said closed position of said first and second covers presents said line-edge hinge as the outer edge of said second cover and the appearance of a two-cover folder, and a plurality of article receiving pocket members heat sealed to at least one surface of one of said covers.

2. The folder of claim 1, including a pocket for receiving and holding a pad of paper.

3. The folder of claim 1, including a transparent plastic sheet overlying and secured to one of said covers, said cover and sheet defining a space therebetween for receiving a calendar.

4. In a portfolio having cover portions fabricated from heat sealable plastic material, the improvement comprising heat seal formed pocket means on a heat sealable surface on one of said cover portions, said heat seal formed pocket means comprising a foldable sheet of heat sealable plastic material folded transversely upon itself to form a plurality of pockets, each pocket having a transverse rear wall joined by a transverse bottom wall to a transverse front wall, said rear and front walls of each of said pockets being heat sealed at opposite sides thereof to define both an open end for insertion of an article in the pocket and an open spacing between said front and rear walls for receiving said article, said material being so folded that the open end of each pocket is spaced from the corresponding open end of every other pocket, said pocket forming folded material being heat sealed to said cover portion.

References Cited by the Examiner

UNITED STATES PATENTS

| | | | |
|---|---|---|---|
| 665,256 | 1/1901 | McComb | 281—31 X |
| 848,429 | 3/1907 | Berry | 281—17 |
| 1,464,340 | 8/1923 | Ringler | 40—124 |
| 1,567,643 | 12/1925 | Hearne | 281—15 X |
| 1,733,388 | 10/1929 | Piltzer | 281—16 X |
| 1,852,963 | 4/1932 | Fladmark | 129—20 |
| 1,913,818 | 6/1933 | Petrick | 281—16 |
| 1,988,998 | 1/1935 | Cornish | 129—20 |
| 2,299,319 | 10/1942 | Gale | 281—15 X |
| 2,354,782 | 8/1944 | Strandling et al. | 281—16 |
| 2,390,125 | 12/1945 | Schade | 281—29 |
| 2,558,996 | 7/1951 | Ullmann | 129—20 X |
| 3,121,966 | 2/1964 | Upton | 40—124 |

FOREIGN PATENTS

| | | |
|---|---|---|
| 272,058 | 3/1914 | Germany. |
| 888,838 | 9/1953 | Germany. |
| 1,048,232 | 7/1953 | France. |

EUGENE R. CAPOZIO, *Primary Examiner.*

LAWRENCE CHARLES, *Examiner.*